United States Patent
Yang et al.

(10) Patent No.: US 6,993,100 B2
(45) Date of Patent: Jan. 31, 2006

(54) BURST DETECTOR

(75) Inventors: Ganning Yang, Irvine, CA (US); John Walley, Ladera Ranch, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 741 days.

(21) Appl. No.: 09/735,369

(22) Filed: Dec. 12, 2000

(65) Prior Publication Data

US 2002/0168034 A1   Nov. 14, 2002

(51) Int. Cl.
  *H04L 25/06*   (2006.01)
(52) U.S. Cl. ..................... 375/342; 375/317; 375/341
(58) Field of Classification Search ............... 375/317, 375/341, 342; 455/522
  See application file for complete search history.

(56) References Cited

U.S. PATENT DOCUMENTS

| | | | |
|---|---|---|---|
| 5,272,446 A * | 12/1993 | Chalmers et al. ........... 329/304 |
| 5,590,410 A * | 12/1996 | Deutsch et al. ............... 455/76 |
| 5,621,764 A * | 4/1997 | Ushirokawa et al. ........ 375/317 |
| 5,621,766 A * | 4/1997 | Bakke et al. ................ 375/340 |
| 5,802,076 A * | 9/1998 | Weigand et al. ............. 714/747 |
| 5,995,816 A * | 11/1999 | Grayson et al. ......... 455/246.1 |
| 6,272,186 B1 * | 8/2001 | Bontu et al. ................ 375/340 |
| 6,370,210 B1 * | 4/2002 | Yamamoto .................. 375/345 |
| 6,603,746 B1 * | 8/2003 | Larijani et al. ............. 370/318 |
| 6,690,681 B1 * | 2/2004 | Preston et al. .............. 370/493 |

* cited by examiner

*Primary Examiner*—Stephen Chin
*Assistant Examiner*—Jaison Joseph

(57) ABSTRACT

A system for detecting a burst in a wireless communications system. A signal strength indicator indicates the strength of an incoming signal representative of incoming packets. A signal strength change detector detects changes in the signal strength of the incoming signal. Signal strength detection logic determines if a change in signal strength of a predetermined magnitude has occurred. A pattern detector detects patterns of symbols, or symbol estimates, in the incoming signal to determine if a predetermined pattern of symbols is present. Burst detection logic signals detection of a burst if the signal strength detection logic determines that a change in signal strength of predetermined magnitude has occurred, and the pattern detector determines that a predetermined pattern of symbols is present.

12 Claims, 12 Drawing Sheets

BURST DETECTOR

BACKGROUND OF THE INVENTION

1. Field of the Invention

This invention relates generally to frequency and/or timing acquisition in a wireless communications system, and, more specifically, reliable burst detection as an antecedent to frequency and/or timing acquisition in a wireless communications system.

2. Related Art

In wireless communications systems, a recipient of a wireless transmission, be it a mobile station or a land station or some other element, must become aware of the timing of and frequency with which the transmission occurred in order to decipher the information in the transmission. Such a process is often referred to as the recipient "acquiring" the frequency or timing of the transmission.

Conventional approaches for timing and/or frequency acquisition include closed loop techniques such as Symbol Timing Recovery (STR) or Automatic Frequency Control (AFC). In these techniques, a transmission is prefaced with a preamble, and the recipient acquires frequency and/or timing by analyzing the preamble.

The problem with these techniques is that the acquisition process can take an inordinate amount of time if there is a large frequency offset between the initial assumed frequency and the actual frequency of the transmission, or there is a large timing error between the initial assumed timing and the actual timing of the transmission. Another problem is that, because data cannot be interpreted until acquisition occurs, there is a danger that data will be received before acquisition occurs, and therefore lost.

The problem can be minimized or corrected by increasing the size of the preamble, but that will degrade system throughput. Moreover, long preambles are also not possible in systems employing protocols such as Bluetooth which are based on standards requiring short preambles. Moreover, because of frequency hopping, in which different packets are transmitted at different frequencies, systems employing protocols such as Bluetooth cannot accommodate long preambles because of the adverse effect that would have on system throughput.

Conventional approaches also include open loop techniques such as that employed in PHS (Personal Handyphone System). An open loop system requires that the recipient be aware of an initial frequency estimation or initial timing estimation. These systems also require that the recipient be aware of the starting point of data transmission. Such a requirement is a significant limitation because it requires that all transmissions be synchronized, which, as a practical matter, may not possible in many systems today.

Some systems, such as TDMA systems, utilize burst detection techniques to detect the timing of an incoming transmission. However, many of these techniques are not reliable in the case of a short preamble as that employed in Bluetooth, which uses only 4 symbols in the preamble.

SUMMARY

The invention provides a burst detection system where one or more power change detectors and one or more pattern detectors are jointly used to detect incoming bursts in the preambles of incoming packets. Detection of an incoming burst then triggers frequency acquisition and demodulation of the bodies of the incoming packets, thereby allowing recovery of the underlying data.

The one or more power change detectors may include a short-term power change detector and a long-term power change detector. A pattern detector may also be included to operate in parallel with the short-term and long-term power detectors. A signal representing the incoming packets may be simultaneously input into the short-term and long-term power detectors, and the pattern detector.

Power change detection logic may also be included to determine if a short-term power change in the incoming signal as detected by the short-term power change detector is of a predetermined magnitude and if a long-term power change in the incoming signal as detected by the long-term power change detector is of a predetermined magnitude. In one example, long-term power detection occurs by monitoring changes in current short-term power versus previous long-term power, but it should be appreciated that other examples are possible.

A pattern detector operating in parallel with the short-term and long-term power change detectors determines if a predetermined pattern of bits is present in the incoming signal. Burst detection logic then signals the detection of a burst if the power change detection logic signals that short and long-term power changes of sufficient magnitude have occurred in the incoming signal, and if the pattern detector detects the predetermined pattern of bits in the incoming signal. Detection of a burst triggers an acquisition and demodulation block to acquire frequency and begin demodulation of the remainder of the packet.

In a Bluetooth implementation, an instantaneous received signal strength indicator (RSSI) block detects the instantaneous RSSI of an incoming quadrature baseband signal. A short-term power detector, which may be implemented as an M-sample boxcar filter, samples the instantaneous RSSI over M samples, and produces a short-term moving average from the M samples. An M-tap delay line may provide the moving average determined M samples ago. A long-term power detector, which may be implemented as an exponential window filter, produces a long-term average of the instantaneous RSSI by producing a weighted average of the instantaneous RSSI and the previous value of the long-term average.

The power change detection logic monitors the ratio between the current and previous short-term moving averages to determine if the ratio exceeds a predetermined threshold. It also monitors the ratio between the current short-term moving average and the long-term weighted average to determine if that ratio exceeds a predetermined threshold. If both conditions are met, the power change detection logic signals this occurrence on an output signal.

A differential phase detector receives as an input the quadrature baseband signal, and produces therefore a differential phase signal $\delta\theta_n$. A symbol spaced differentiator receives as an input the differential phase signal $\delta\theta_n$, and further differentiates it to eliminate frequency offset. The signal which is produced, $\delta\delta\theta_n$, is given by the following expression: $\delta\delta\theta_n = \delta\theta_n - \delta\theta_{n-L}$, where L, the oversampling rate, in terms of number of samples per symbol. In current Bluetooth implementations, the oversampling rate L is set to 4.

In current Bluetooth implementations, the packet preambles embody a predetermined pattern of 4 symbols, either 1010 or 0101. Consequently, in an environment free from noise, the absolute value of two successive values of $\delta\delta\theta_n$, when determined in the packet preamble, should be 0, and the signs of the two values should be of opposite polarity.

Pattern detection logic detects if two successive values of $\delta\delta\theta_n$, as determined over the packet preambles, is less than a predetermined threshold determined to take account of noise. If this condition is met, and the signs of the two values are of opposite polarity, the pattern detection logic signals the occurrence of these two conditions on an output signal.

A moving window accumulator sums the output of the pattern detection logic over N samples. The number N is the number of samples represented by the packet preamble. In current Bluetooth implementations, the number N is 16, representing 4 samples/symbol over 4 symbols.

A peak detector detects whether the output of the moving window accumulator has reached a peak and exceeds a predetermined threshold, signifying that a predetermined pattern of symbols has been detected in a packet preamble. If so, the peak detector signals the occurrence of this condition on an output signal.

Burst detection logic receives as inputs the output signal of the peak detector, and the output signal of the power change detection logic. If the output of the moving window accumulator has peaked and exceeded a predetermined threshold, as detected by the peak detector, and if both short-term and long-term power changes in the incoming signal have occurred as detected by the power change detection logic, burst detection logic signals the occurrence of a burst.

The burst detection logic signals this condition to the acquisition and demodulation block. This block receives as an input the output $\delta\theta_n$ of the differential phase detector after passage through a delay compensation buffer. The delay compensation buffer compensates for the delay inherent in the foregoing pattern and power change detection circuitry. Upon detecting a burst, the acquisition and demodulation block acquires frequency and begins demodulating the differential phase input $\delta\theta_n$ from the differential phase detector. That permits the underlying data in the bodies of the packets to be recovered.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

The subject invention includes a burst detection system where one or more power change detectors and one or more pattern detectors are jointly used to detect incoming bursts in the preambles of incoming packets. Detection of an incoming burst then triggers frequency and timing acquisition and demodulation of the bodies of the incoming packets, thereby allowing recovery of the underlying data.

Figure 1:
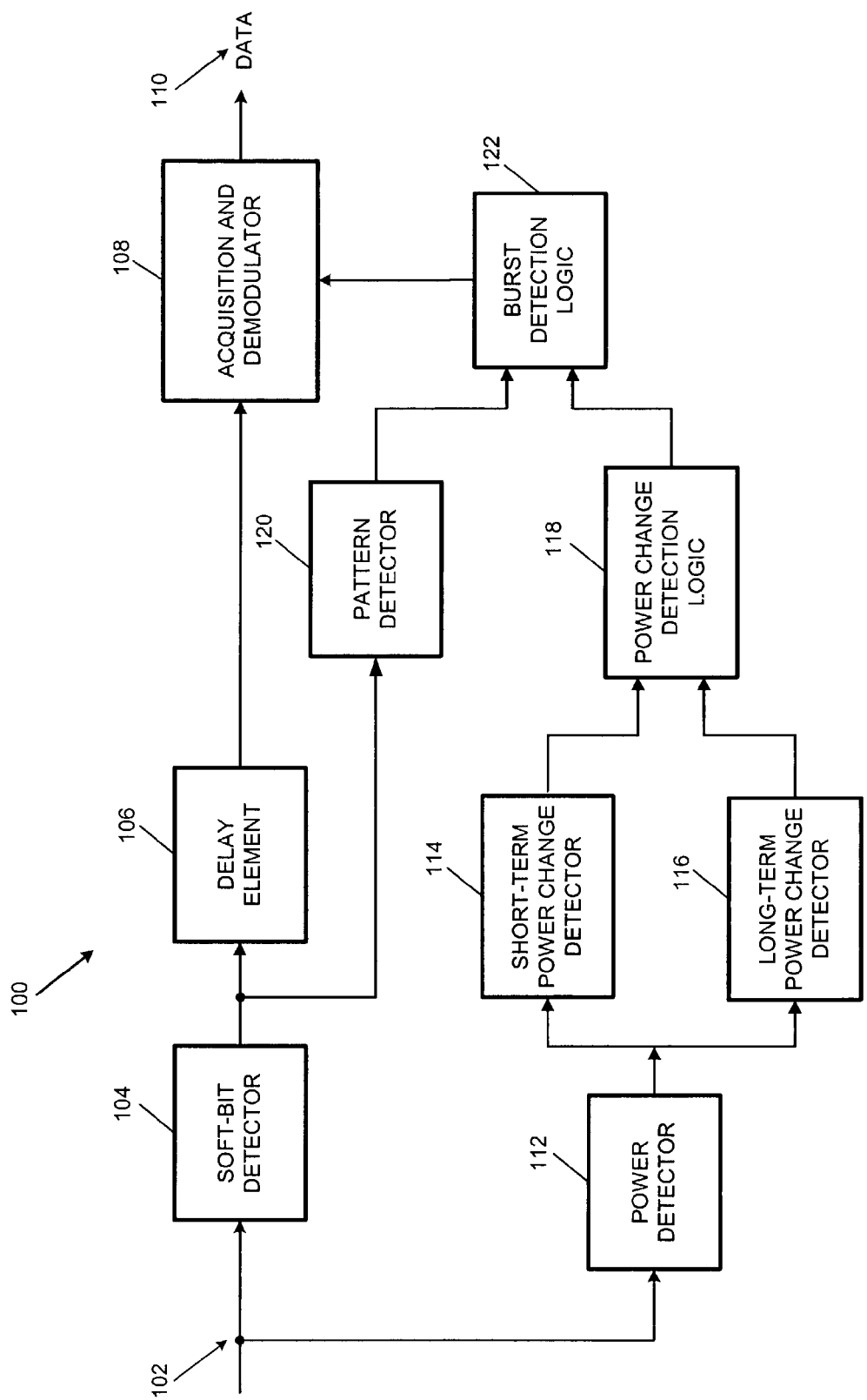
FIG. 1 is a block diagram of an embodiment of a burst detection system according to the invention.

A first embodiment of a burst detection system in accordance with the invention is illustrated in FIG. 1. As illustrated, an incoming signal embodying incoming packets is input in parallel to soft-bit detector 104 and power detector 112. Soft-bit detector 104 is configured to detect symbols in the incoming symbol 102 and power detector 112 is configured to detect the power of the incoming signal.

In one implementation, the incoming signal may comprises a quadrature baseband signal having I and Q components, and the soft-bit detector 104 may comprises a differential phase detector which converts the quadrature baseband signal into the theta ($\theta$) domain, and then differences the resulting signal to produce phase differences $\delta\theta$ represented by the incoming signal. The phase differences $\delta\theta$ constitute soft estimates of the underlying symbols, and can be converted into symbols through comparison with a predetermined threshold.

Alternatively, the soft-bit detector 104 may comprise an FM detector which converts the quadrature baseband signal into the theta domain, and then differentiates the resulting signal to produce frequency values. These frequency values again constitute soft estimates of the underlying symbols, and can be converted into symbols through comparison with a predetermined threshold. One of ordinary skill in the art will appreciate, from a reading of this disclosure, that other forms of symbol detection may be possible.

The power detector 112 may comprise in one implementation an instantaneous received signal strength indicator (RSSI) block which detects the instantaneous strength of the incoming signal 102. One of ordinary skill in the art will appreciate from a reading of this disclosure that other forms of power or signal strength detection may be possible.

The output of the power detector in this embodiment is coupled in parallel to a short-term power change detector 114 and a long-term power change detector 116. The short-term power change detector 114 monitors short-term changes in the power or strength of the incoming signal as detected by the power detector 112, and the long-term power change detector 116 monitors long-term changes in the power or strength of the incoming signal as detected by the power detector 112.

Power change detection logic 118 determine if a short-term power change in the incoming signal as detected by the short-term power change detector 114 is of a predetermined magnitude and if a long-term power change in the incoming signal as detected by the long-term power change detector is of a predetermined magnitude. In one implementation, power change detection logic 118 determines whether or not a short-term power change as detected by the short-term power change detector 114 exceeds a predetermined threshold, and whether or not a long-term power change as detected by the long-term power change detector 116 exceeds a predetermined threshold. These thresholds are determined to avoid "false alarm" situations and distinguish over power changes due to the presence of noise. If both conditions are present, the power change detection logic 118 signals the occurrence of this situation on an output signal.

Pattern detector 120 operates in parallel with the short-term and long-term power change detectors 114, 116 to determine if a predetermined pattern of symbols is present in the packet preamble embodied in the incoming signal. The pattern detector 120 receives the symbols or estimates produced by the symbol detector, and monitors the same to determine if the predetermined symbol pattern is present. If the predetermined symbol pattern is detected, pattern detector 120 signals the occurrence of this condition on an output signal.

Burst detection logic monitors the signals output from the power change detection logic 118, and the pattern detector 120. If the signals indicate (a) that the predetermined pattern of symbols has been detected; and (b) both short- and long-term power changes of sufficient magnitude have been detected, then the burst detection logic 122 signals on an output signal the detection of a burst. Detection of a burst triggers an acquisition and demodulation block 108 to acquire frequency and begin demodulation of the remainder of the packet. To ensure proper synchronization between the timing with which the bodies of the packets appear at the acquisition and demodulation block 108 and the detection of a burst through the packet preambles, and compensate for delay through the foregoing burst detection circuitry, a delay element 106 is provided.

In one example application, the system of FIG. 1 is employed in an environment consistent with the Bluetooth Wireless Technology Standard (hereinafter referred to as "Bluetooth"). Bluetooth is a computing and telecommunications industry specification that describes how mobile phones, home and business phones, computers, and PDAs (personal digital assistants) can easily interconnect with each other using a short-range wireless connection. Bluetooth is specifically designed to provide low-cost, robust, high-capacity voice and data networking. It features fast frequency hopping to avoid interference and short data packets to maximum capacity during interference.

Figure 2:
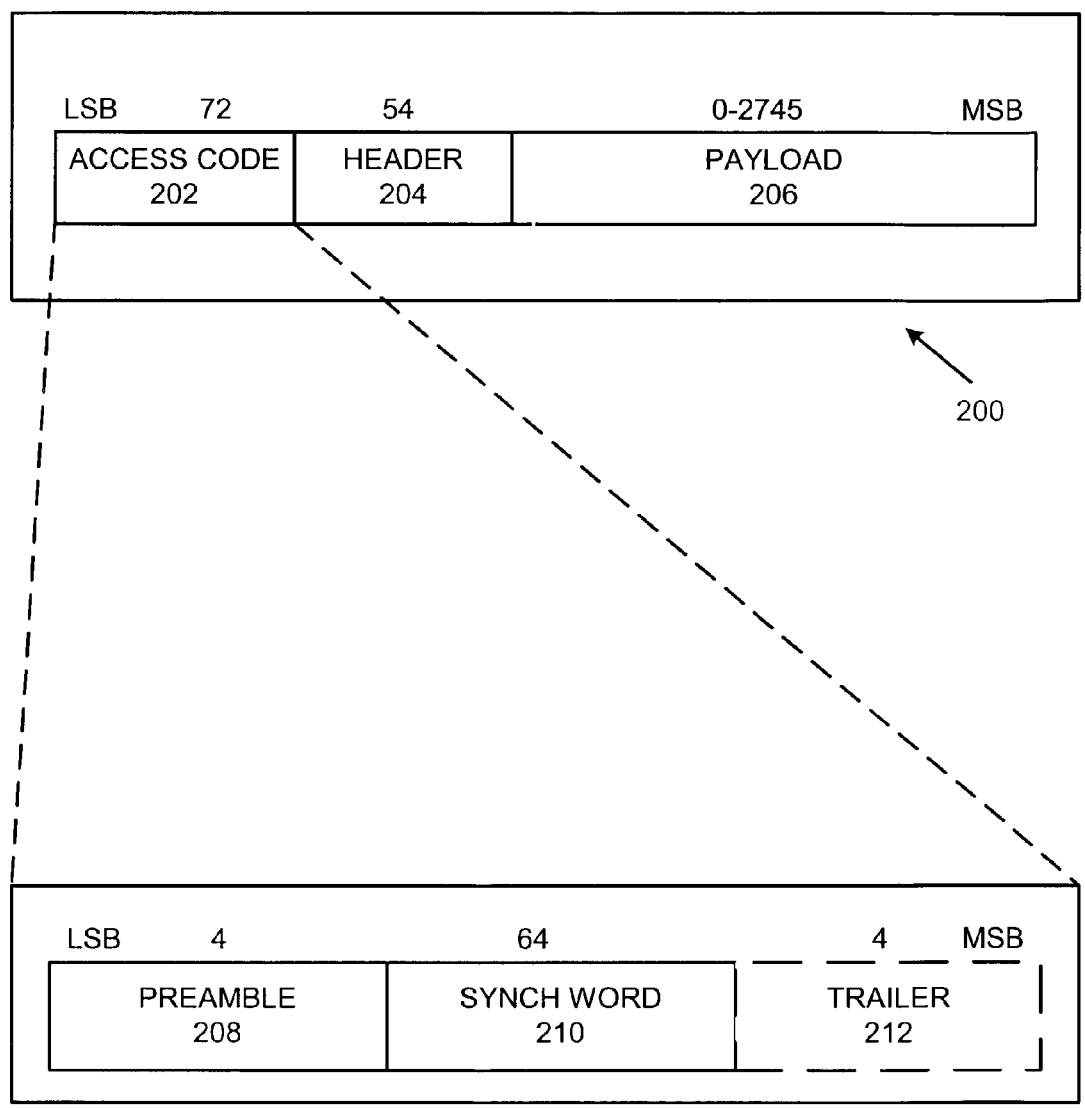
FIG. 2 illustrates example packet formats in an example Bluetooth environment.

In Bluetooth, information is conveyed in the form of packets. The format of a standard Bluetooth packet 200 is illustrated in FIG. 2. The standard packet 200 includes a 72-bit access code 202, a 54-bit header 204 and a payload 206 of variable length ranging from zero to 2,745 bits. The 72-bit access code 202 includes a 4-bit preamble 208, a 64-bit sync word 210, and a 4-bit trailer 212. The 72-bit access code 202 is generally used for synchronization, DC offset compensation and identification, such as between different senders.

Figure 3:
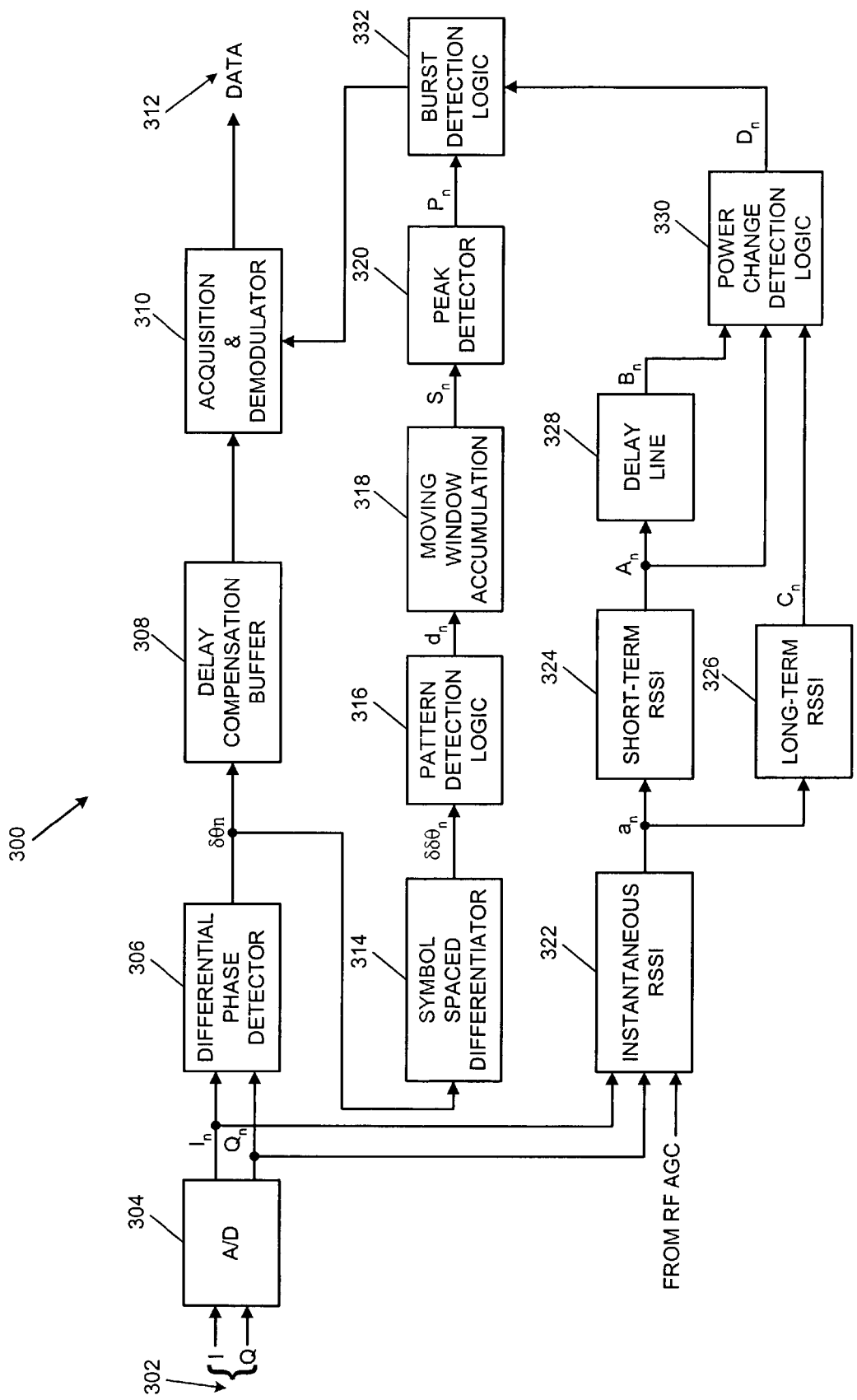
FIG. 3 is a block diagram of a burst detection system configured for use in a Bluetooth environment.

FIG. 3 illustrates an embodiment of a burst detector configured for use in a Bluetooth environment. The purpose of the burst detector in this embodiment is to accurately determine the burst starting point. The detector continuously monitors the incoming signal 302 to see if a burst is incoming. If a burst is detected, as will be seen, acquisition and demodulation block 310 is triggered to commence frequency/timing acquisition and data recovery.

In this embodiment, a quadrature baseband signal 302 having I and Q components is input to A/D converter 304. A/D converter 304 converts the signal into the digital baseband. The digital baseband signal is input in parallel to the differential phase detector 306 and the instantaneous received signal strength indicator (RSSI) block 322.

Instantaneous RSSI block 322 detects the instantaneous RSSI of the incoming digital quadrature baseband signal, and outputs a signal $a_n$ representative of this instantaneous RSSI. In one implementation, this instantaneous RSSI output signal $a_n$ may be derived from the I and Q components of the baseband signal, and optionally scaled using the scale factor SCALE as determined by RF AGC setting information. The determination of $a_n$ in this implementation may be represented by the following expression:

$$a_n = \max\{|I_n|, |Q_n|\} + 0.5 * \min\{|I_n|, |Q_n|\} * \text{SCALE}. \qquad (1)$$

Short-term RSSI detector 324 samples the instantaneous RSSI signal $a_n$ over a relatively small number of samples to reduce noise variance. In one example, short-term RSSI detector 324 may be implemented as an M-sample boxcar filter, which samples the instantaneous RSSI over M samples, and produces an output signal $A_n$ representing a short-term moving average of the M samples.

Figure 4:
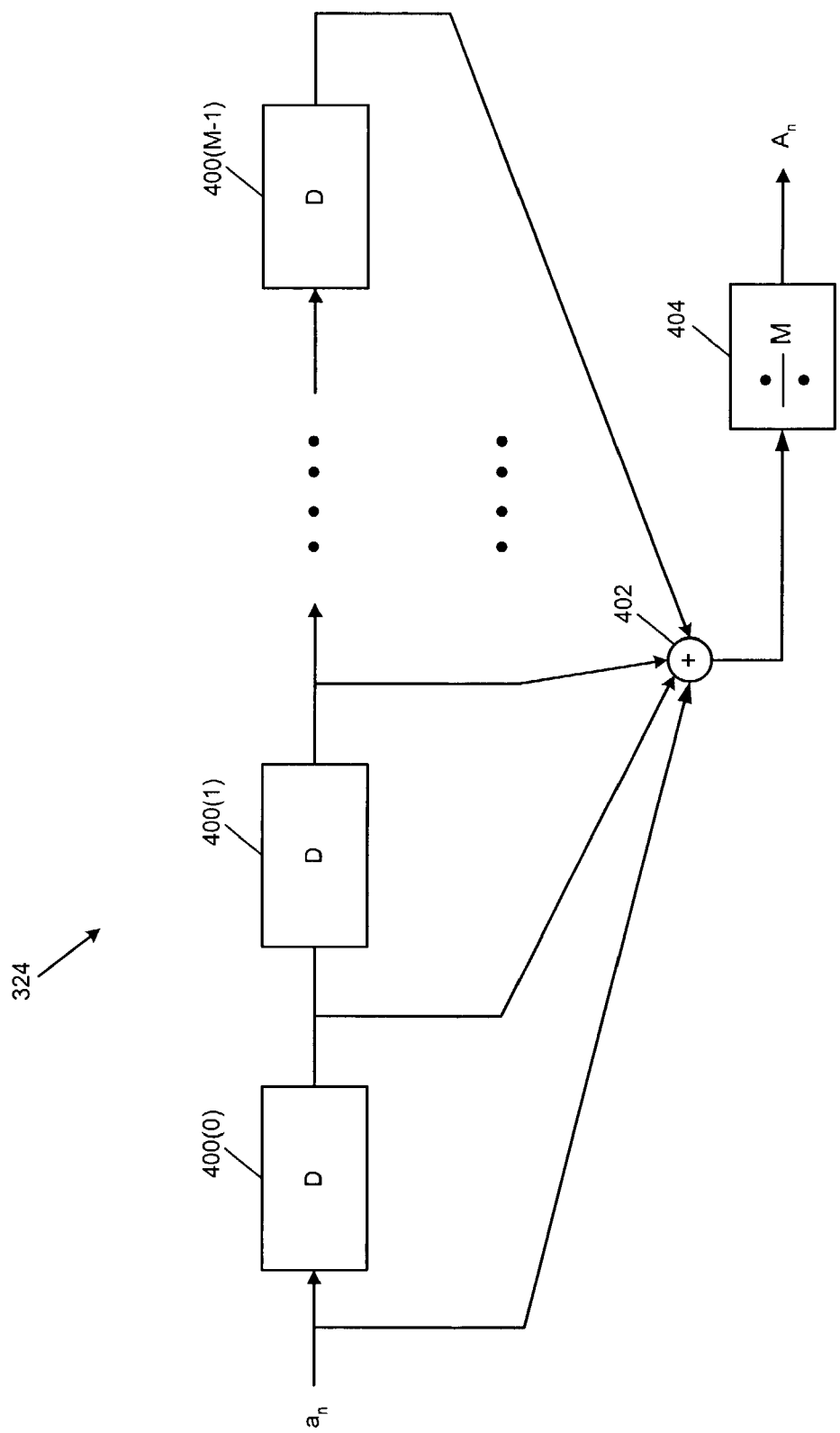
FIG. 4 is a block diagram of an implementation example of an M-sample boxcar filter for use in a short-term power detector.

An example implementation of such a boxcar filter is illustrated in FIG. 4. The instantaneous RSSI signal $a_n$ is input to a series combination of M storage elements 400(0), 400(1), . . . , 400(M-1). The storage elements are linked together such that successive samples of $a_n$ successively pass through the storage elements in succession. The output of each storage element 400(0), 400(1), . . . , 400(M-1) is input to summer 402. Summer 402 outputs the sum of the contents of the storage elements, and divider 404 divides the sum by M, thus producing a moving average $A_n$ computed over M samples of the input signal $a_n$. In one Bluetooth implementation, the parameter M is set to 4, the number of samples in a packet preamble.

Figure 5:
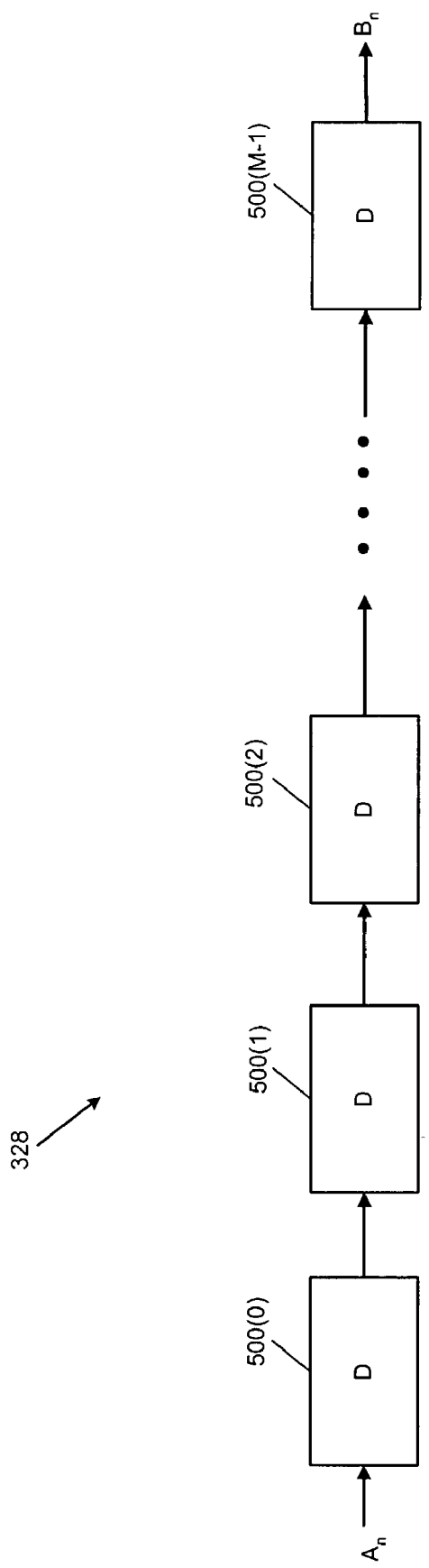
FIG. 5 is a block diagram of an M-tap delay line for use in conjunction with the short-term power detector of FIG. 4 to detect short-term power changes.

Turning back to FIG. 3, in the burst detector, a delay line 328 provides a previous value $B_n$ of the moving average $A_n$. In the implementation where short-term RSSI detector 324 is implemented as an M-sample boxcar filter, delay line 328 may be implemented as an M-tap delay line configured to output the moving average from detector 324 determined M samples ago. An example implementation of an M-tap delay line is illustrated in FIG. 5. The current M-sample moving average $A_n$ from detector 324 is input to a series combination of M storage elements, 500(0), 500(1), 500(2), . . . , 500(M-1). The storage elements are coupled in series so that successive values of $A_n$ pass successively through the storage elements. The output of the Mth storage element 500(M-1) is $B_n$, representing $A_n$ delayed by M samples.

In the burst detector of FIG. 3, long-term power detector 326 provides an output signal $C_n$ representative of a long-term average of the instantaneous RSSI signal $a_n$ output by instantaneous RSSI block 322. In one example, long-term power detector 326 may be implemented as an exponential window filter, which outputs a weighted average of the instantaneous RSSI signal $a_n$ and a previous value $C_{n-1}$ of the long-term average. The determination of $C_n$ by such a filter may be represented by the following formula:

$$C_n = (1-\alpha)*C_{n-1} + \alpha*a_n \quad (2)$$

where $a_n$ is the input instantaneous RSSI, $C_n$ is the long term RSSI output, and $\alpha$ is the effective time period over which the averaging occurs. In one Bluetooth implementation, the parameter $\alpha$ is set to 1/32.

Power change detection logic 330 monitors the ratio between the current and previous short-term moving averages, $A_n$ and $B_n$, to determine if the ratio exceeds a predetermined threshold. It also monitors the ratio between the current short-term moving average $A_n$ and the long-term weighted average $C_n$ to determine if that ratio exceeds a predetermined threshold. If both conditions are met, the power change detection logic 330 signals this occurrence on an output signal $D_n$.

In one implementation, the decision logic for the power change detection logic 330 can be represented by the following pseudo-code:

If($A_n > T_1*B_n$ and $A_n > T_2*C_n$) then

The Power Change Detector output $D_n$ is set to high for a fixed length window.

Else

The power change detector output $D_n$ is set to low.

where $T_1$ and $T_2$ are predetermined thresholds selected based on specific application requirements such as operational SNR, misdetection rate and false alarm rate. In one Bluetooth implementation, $T_1$ and $T_2$ are both set to 2.

Differential phase detector 306 receives as an input the digital quadrature baseband signal, and produces therefrom a differential phase signal $\delta\theta_n$. Symbol spaced differentiator 314 receives as an input the differential phase signal $\delta\theta_n$, and further differentiates it to eliminate frequency offset. The signal which is produced, $\delta\delta\theta_n$, is given by the following expression: $\delta\delta\theta_n = \delta\theta_n - \delta\theta_{n-L}$, where L, the oversampling rate, in terms of number of samples per symbol. In one Bluetooth implementation, the oversampling rate L is set to 4.

Currently, Bluetooth requires that the packet preambles embody a predetermined pattern of 4 symbols, either 1010 or 0101. Consequently, in an environment free from noise, the absolute value of two successive values of $\delta\delta\theta_n$, when determined in the packet preamble, should be 0, and the signs of the two values should be of opposite polarity.

Figure 6:
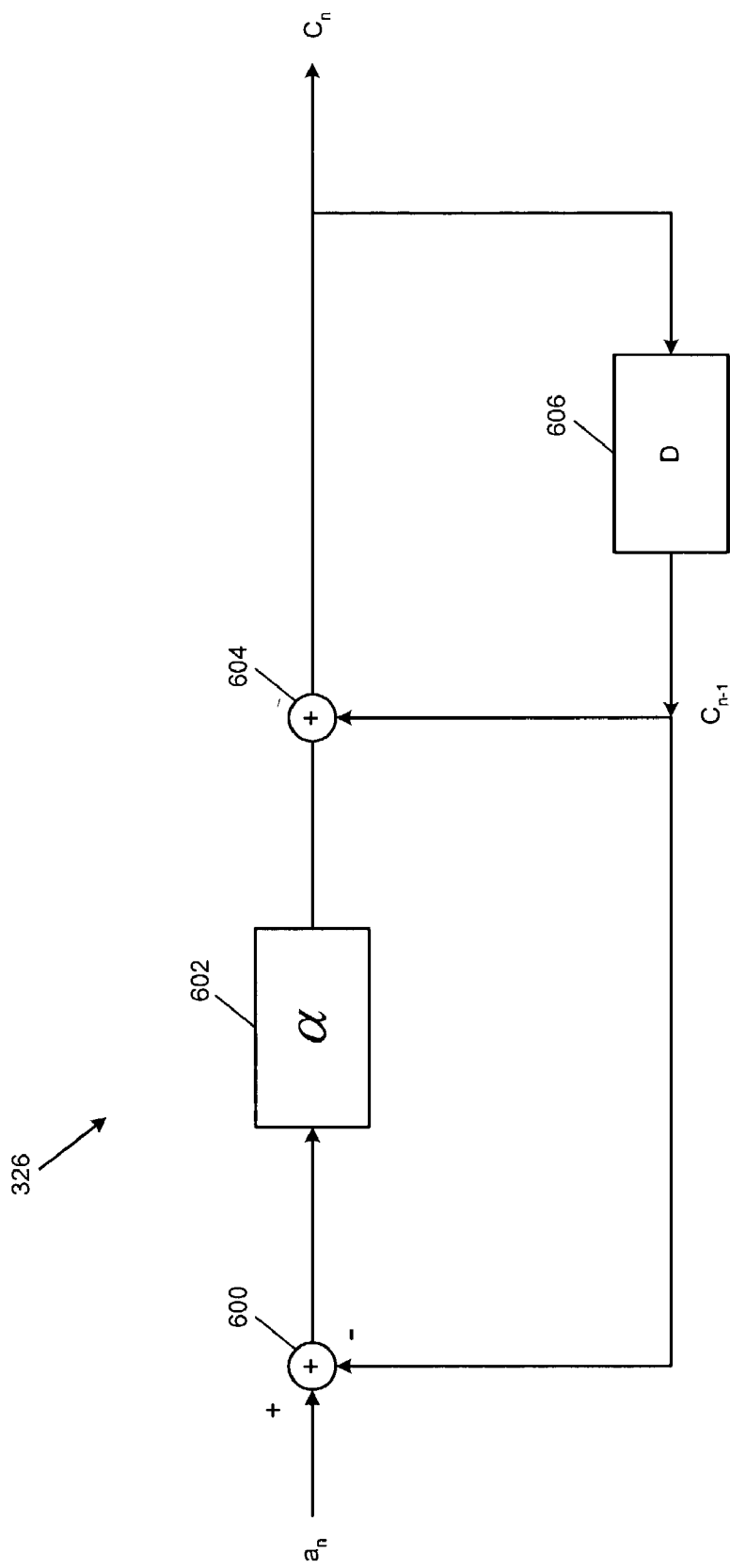
FIG. 6 is a block diagram of an implementation example of an exponential window filter for use in a long-term power detector.
Figure 7:
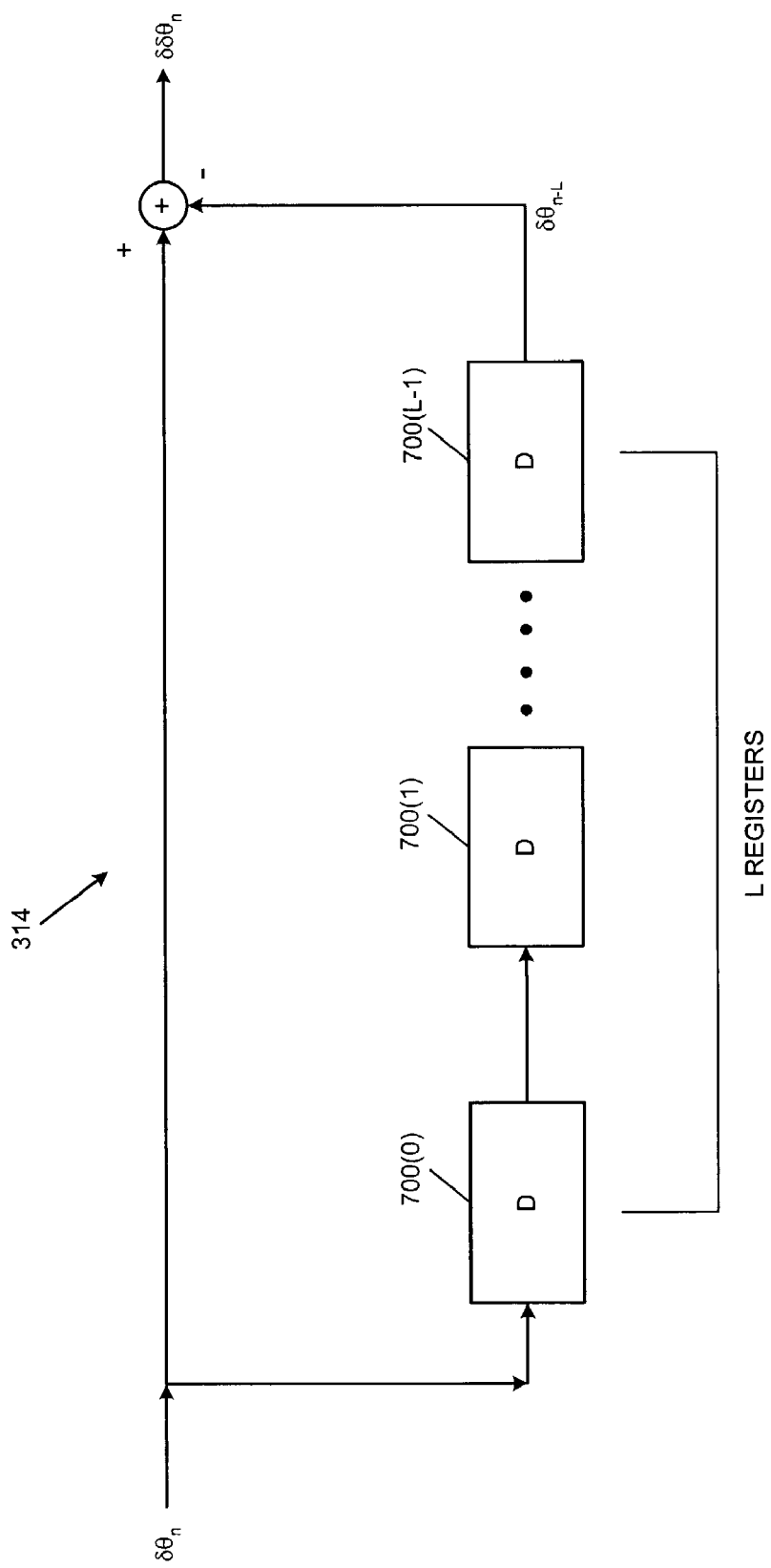
FIG. 7 is a block diagram of an implementation example of a symbol spaced differentiator for use in a burst detection system configured for a Bluetooth environment.
Figure 11:
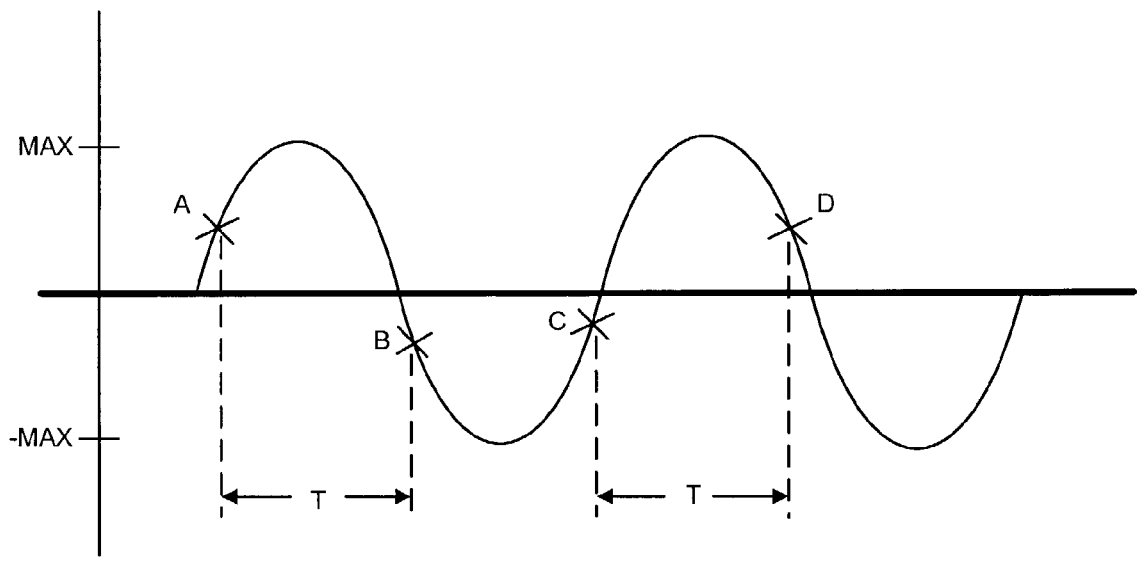
FIG. 11 illustrates a representation of an example signal embodying a 4 bit preamble in a Bluetooth environment.

These conditions can be further understood through consideration of FIG. 11, which illustrates two successive samples of $\delta\delta\theta_n$, A and B, which are spaced by a symbol time period T, in an assumed noise free environment. In this figure, the predetermined pattern which is assumed is 1010. This pattern forms a sine wave, and FIG. 6 illustrates this sine wave after it has been differentiated twice. As can be seen, the result is still a sine wave, with any frequency offset eliminated.

With respect to the two samples A and B, it will be observed that the absolute value of the sum of the amplitudes of the two samples is zero, and their signs are of opposite polarity. It should be noted that these conditions will be present for any two successive samples of $\delta\delta\theta_n$, such as C and D, which are spaced by the symbol time period T.

Due to the presence of noise, however, it may be necessary to slightly relax one or more of these conditions, particularly the condition that the absolute value of two successive symbols sum to zero. Consider, for example, a situation where, due to the presence of noise, the magnitude of the sample A is perturbed to $A' = A+\epsilon$. Due to this perturbation, the magnitudes of the two samples A and B no longer sum to 0, but to $\epsilon$. Consequently, to take account of the presence of noise, a relaxation of this condition may be warranted.

Turning back to the burst detector of FIG. 3, pattern detection logic 316, in accordance with the foregoing principles, detects if two successive values of $\delta\delta\theta_n$, as determined over the packet preambles, is less than a predetermined threshold determined to take account of noise. If this condition is met, and the signs of the two values are of opposite polarity, the pattern detection logic signals the occurrence of these two conditions on an output signal $d_n$. In one implementation, the determination of the output $d_n$ by pattern detection logic 316 can be represented by the following pseudo-code:

If ($|\delta\delta\theta_n + \delta\delta\theta_{n-L}| < T_3$ and $\delta\delta\theta_n * \delta\delta\theta_{n-L} < 0$) then $d_n$=high Else $d_n$=low where $\delta\delta\theta_n$ is the current output of differentiator 314, and $\delta\delta\theta_{n-L}$ is the previous output of differentiator 314 delayed by one symbol time period. Threshold $T_3$ can be determined based on the application requirements, particularly the operational signal-to-noise ratio. In one implementation, the threshold $T_3$ is set to ½ of the maximum value which can be achieved in the sine wave represented by $\delta\delta\theta_n$. For example, with reference to FIG. 11, $T_3$ may be set to the value MAX.

Figure 8:
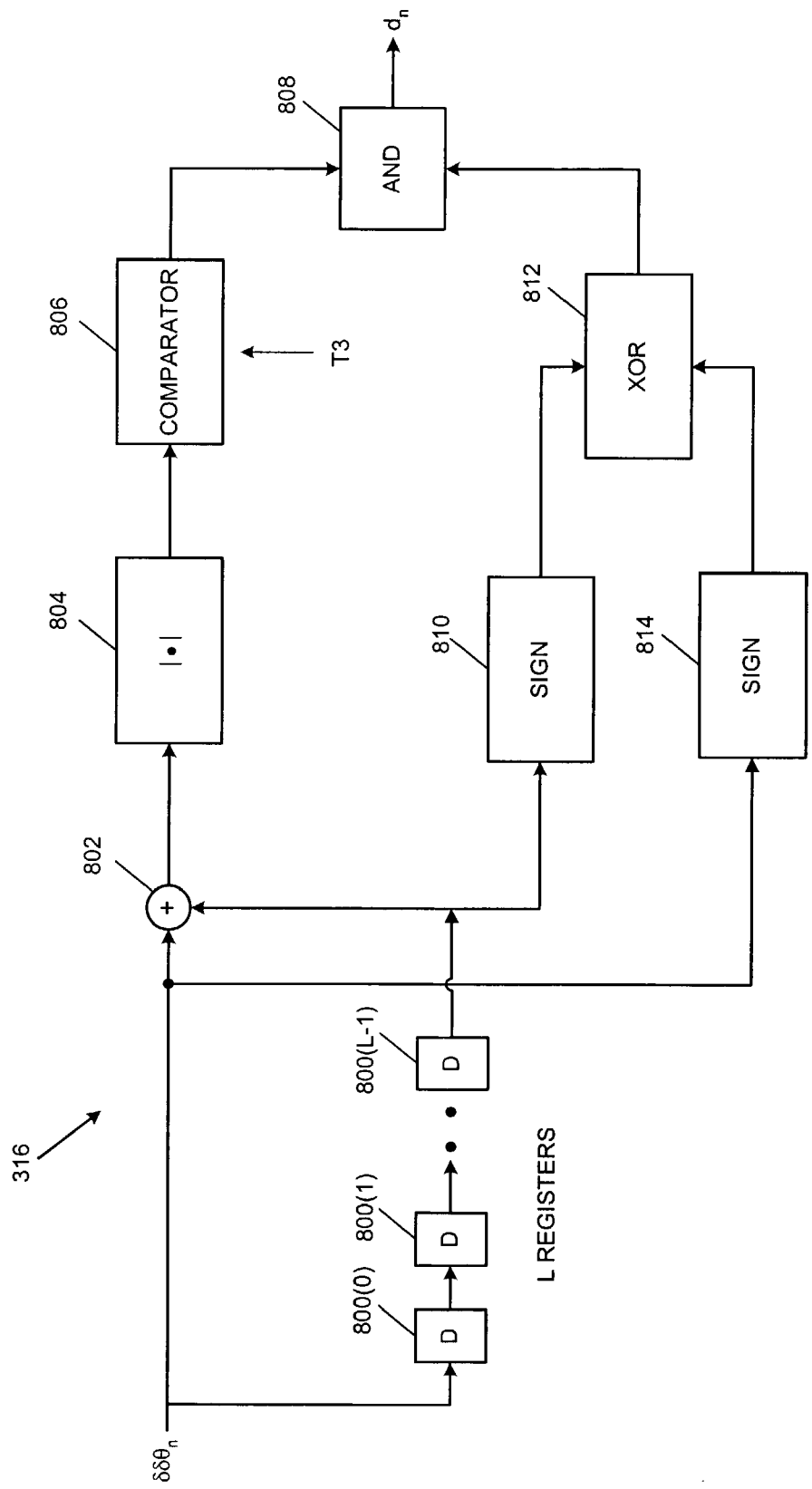
FIG. 8 is a block diagram of an implementation example of pattern detection logic block configured for a burst detection system in a Bluetooth environment.

An example implementation of pattern detection logic 316 is illustrated in FIG. 8. As illustrated, the samples $\delta\delta\theta_n$ are input in parallel to summer 802, and the series combination of L storage elements 800(0), 800(1), . . . , 800(L-1). The storage elements are configured such that successive samples of $\delta\delta\theta_n$ pass through each of the storage elements in succession, and the output of the Lth shift register is $\delta\delta\theta_{n-L}$, a previous version of $\delta\delta\theta_n$. As discussed previously, the number L is such that $\delta\delta\theta_{n-L}$ and $\delta\delta\theta_n$ are spaced by one symbol time period T.

The values $\delta\delta\theta_n$ and $\delta\delta\theta_{n-L}$ are input to summer 802. The output of summer 802 is input to block 804, which determines the absolute value of the output of summer 802. The output of block 804 is input to comparator 806, which compares this absolute value with a threshold $T_3$. If this threshold is not exceeded, comparator 806 signals this condition on its output signal.

Meanwhile, the value $\delta\delta\theta_{n-L}$ output from storage element 800(L-1) is input to block 810, and the value $\delta\delta\theta_n$ is input to block 814. Block 810 determines the sign of $\delta\delta\theta_{n-L}$, and signals the same on its output. Similarly, block 814 determines the sign of $\delta\delta\theta_n$, and signals the same on its output. The outputs of blocks 810 and 814 are input to XOR block 812, which performs an exclusive OR function to determine if the signs of the two values $\delta\delta\theta_n$ and $\delta\delta\theta_{n-L}$ are the same or different. If the two are different, XOR block 812 signals this condition on its output signal.

The outputs of comparator 806 and XOR block 812 are input to AND block 808. AND block 808 determines whether the two conditions are satisfied whereby the absolute value of the sum of $\delta\delta\theta_n$ and $\delta\delta\theta_{n-L}$ is less than the predetermined threshold $T_3$, and the signs of $\delta\delta\theta_n$ and $\delta\delta\theta_{n-L}$ are different. If both conditions are satisfied, AND block 808 signals this situations on its output signal $d_n$.

Turning back to the burst detector of FIG. 3, moving window accumulator 318 sums the output $d_n$ of the pattern detection logic 316 over N samples, where the number N is the number of samples represented by the packet preamble. The summed output from the moving window accumulator 318 is designated as $S_n$ in the figure. In current Bluetooth implementations, the number N is 16, representing 4 samples/symbol over 4 symbols, consistent with a 4 MHz sampling rate.

Figure 9:
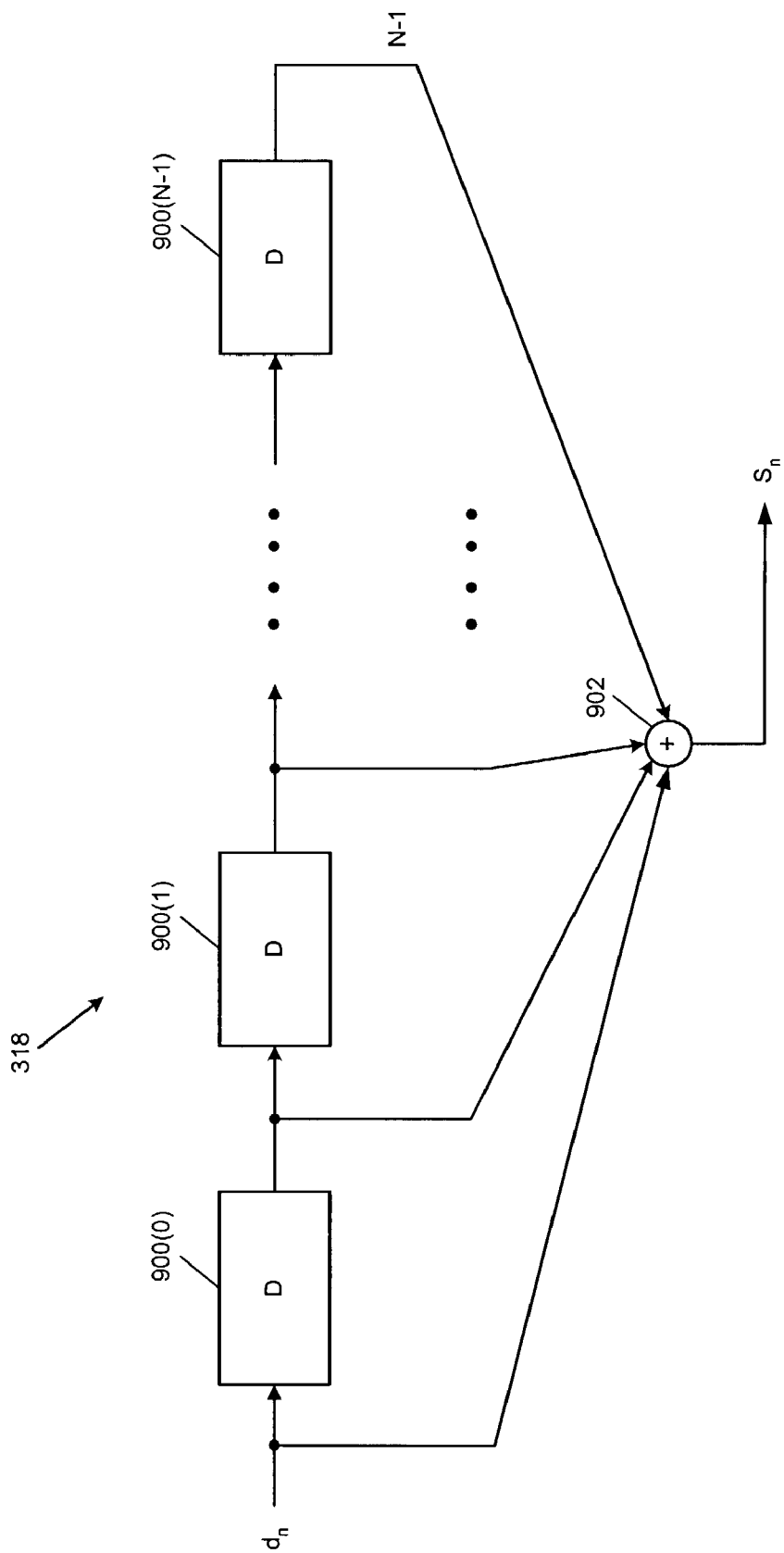
FIG. 9 is a block diagram of an implementation example of a moving window accumulation block configured for a burst detection system in a Bluetooth environment.

Moving window accumulator 318 may be implemented as shown in FIG. 9. As shown, the signal $d_n$ from pattern detection logic 316 is input to a series combination of N storage elements 900(0), 900(1), . . . , 900(N-1). The N storage elements are configured so that successive values of $d_n$ pass through each of the delay elements in succession. The outputs of the storage elements are each input to summer 902, which outputs as $S_n$ the sum of the contents of the N storage elements.

In the burst detector of FIG. 3, peak detector 320 detects whether the output $S_n$ of the moving window accumulator 318 has reached a peak and exceeds a predetermined threshold, signifying that a predetermined pattern of symbols has been detected in a packet preamble. If so, the peak detector 320 signals the occurrence of this condition on the output signal $P_n$.

In one implementation, the determination of $P_n$ by the peak detector 320 can be represented by the following pseudo-code:

If $(S_{n-1}>=S_n$ and $S_{n-1}>=S_{n-2}$ and $S_{n-1}>T_4)$ then $P_n$=high

Else $P_n$ low where $T_4$ is a predetermined threshold whose specific value depends on application requirements such as operational SNR, false alarm rate and misdetection rate. In one implementation, the threshold $T_4$ is set to 12–14.

Figure 10:
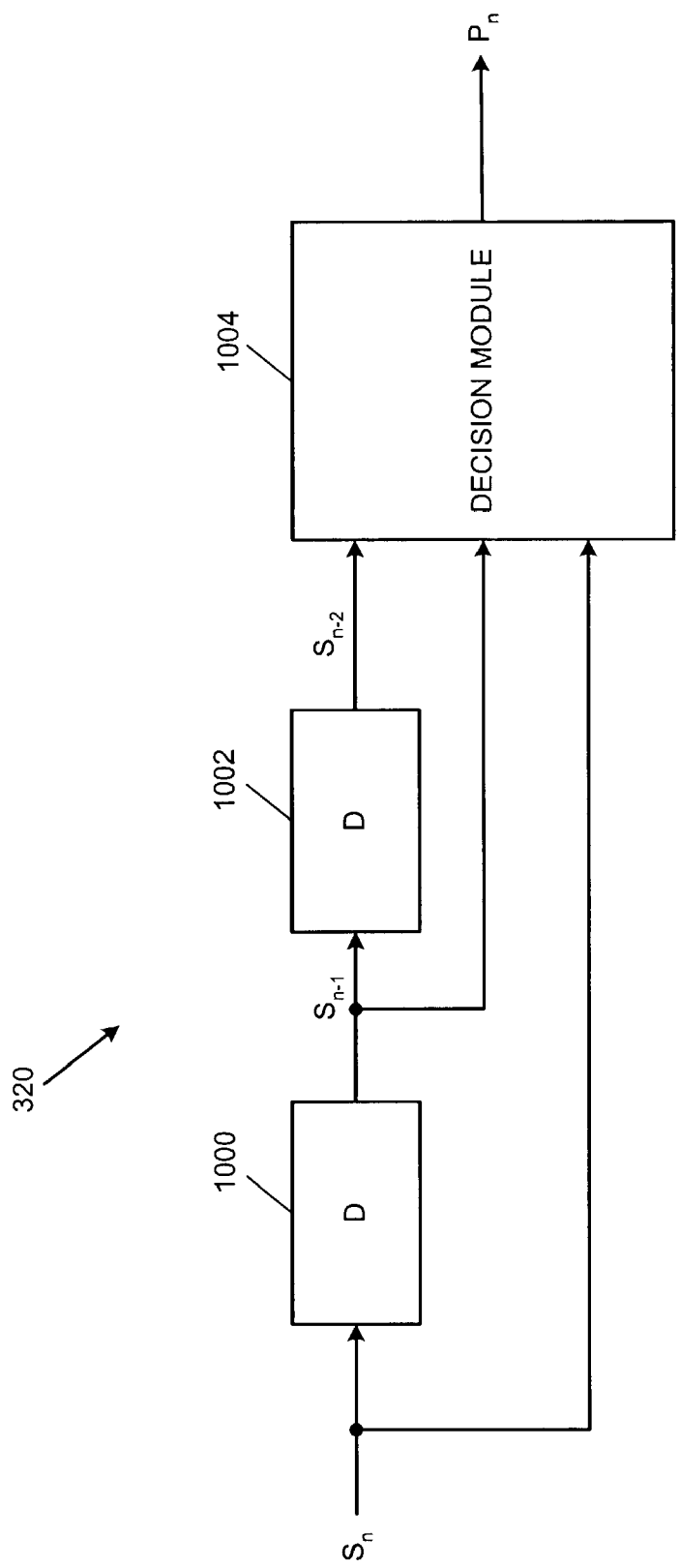
FIG. 10 is a block diagram of an implementation example of a peak detector configured for a burst detection system in a Bluetooth environment.

FIG. 10 illustrates a block diagram of this implementation of peak detector 320. As illustrated, the signal $S_n$ is input to the series combination of storage elements 1000 and 1002. These storage elements are configured such that successive values of $S_n$ pass successively through each of the storage elements. Consequently, $S_{n-1}$ is an output from storage element 1000, and $S_{n-2}$ is output from storage element 1002. The signals $S_n$, $S_{n-1}$, and $S_{n-2}$ are each input to decision module 1004 which is configured to determine the output $P_n$ in accordance with the above pseudo-code.

Turning back to the burst detector of FIG. 3, burst detection logic 332 receives as inputs the output signal of the peak detector 320, and the output signal of the power change detection logic 330. If the output of the moving window accumulator 318 has peaked, as detected by the peak detector 320, and if both short-term and long-term power changes in the incoming signal have occurred as detected by the power change detection logic 330, burst detection logic 332 signals the occurrence of a burst. The occurrence of a burst (a) indicates an accurate burst starting point for timing/ frequency acquisition in the packet preamble; and (b) activates block 310 to begin data demodulation. If one implementation, burst detection logic 332 simply signals the occurrence of a burst if both $D_n$ and $P_n$ are high. Otherwise the burst is not detected.

The acquisition and demodulation block 310 receives as an input the output $\delta\theta_n$ of the differential phase detector 308 after passage through the delay compensation buffer 310. The delay compensation buffer 310 is configured to compensate for the total delay inherent in the burst detection circuitry between the time that a packet is received and a burst is detected. Upon detection of a burst, the acquisition and demodulation block 310 is configured to acquire timing and frequency, and begin demodulating the differential phase input $\delta\delta\theta_n$ from the differential phase detector 306. That permits the underlying data 312 in the bodies of the packets (the payload filed 206 in FIG. 2) to be recovered.

Figure 12:
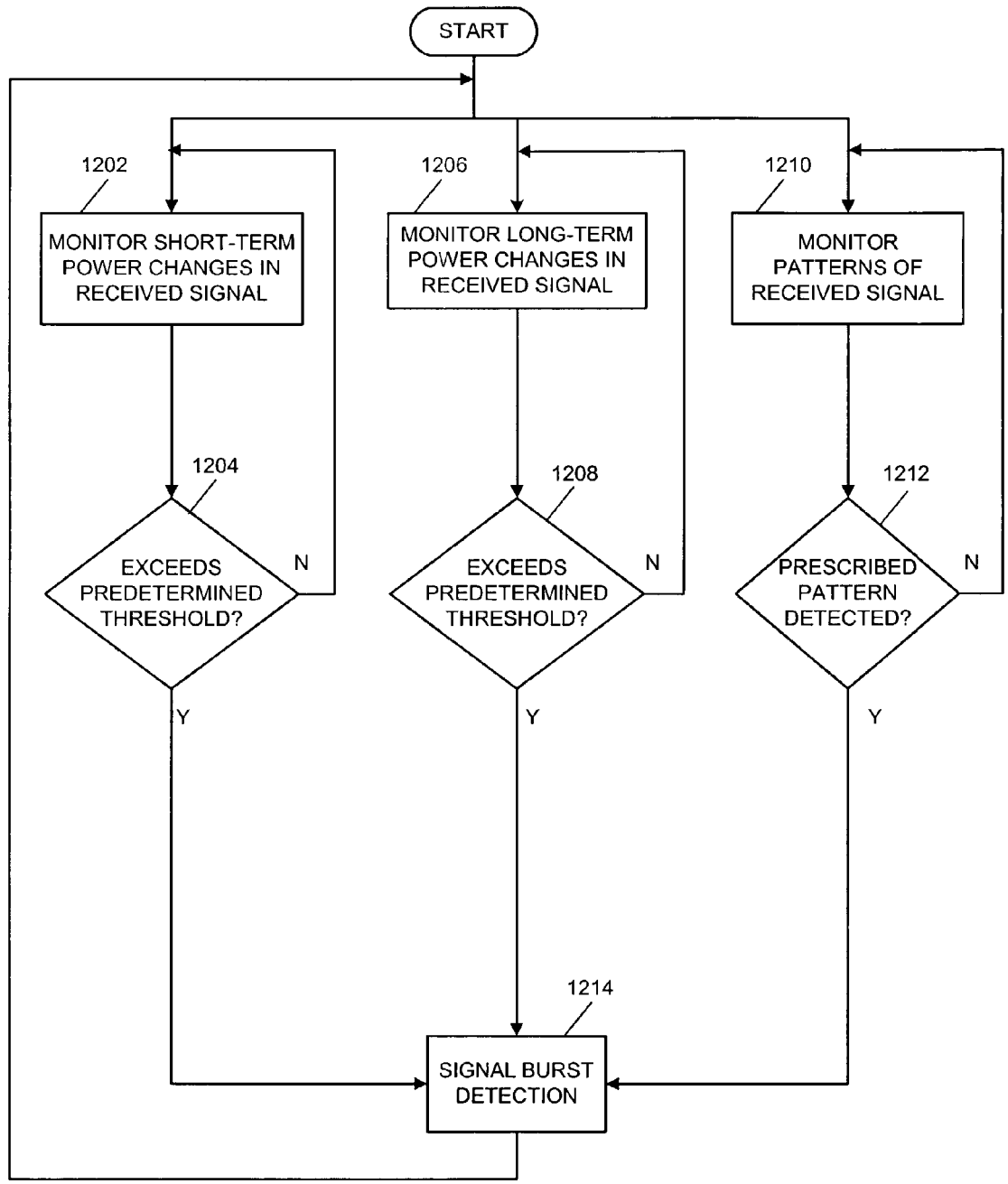
FIG. 12 is a flowchart illustrating an embodiment of a method of operation of the burst detection system according to the invention.

FIG. 12 is a flowchart illustrating an embodiment of a method of operation of a burst detector in accordance with the invention. As shown, after initiation of the process, steps 1202, 1206, and 1210 are performed in parallel.

In step 1202, short-term power changes in the received signal are monitored. Step 1202 is followed by decision block 1204, where any short-term power change detected in step 1202 is compared with a predetermined threshold. If the threshold is not exceeded, a jump is made back to step 1202 for another iteration. If the threshold is exceeded, a jump is made to step 1214.

In step 1206, long-term power changes in the received signal are monitored. Step 1206 is followed by decision block 1208, where any long-term power change detected in step 1206 is compared with a predetermined threshold. If the threshold is not exceeded, a jump is made back to step 1206 for another iteration. If the threshold is exceeded, a jump is made to step 1214.

In step 1210, the pattern of symbols in the received signal is monitored. Step 1210 is followed by decision block 1212, where any pattern of symbols detected in step 1210 is compared with a predetermined pattern. If the predetermined pattern is not detected, a jump is made back to step 1210 for another iteration. If the predetermined pattern is detected, a jump is made to step 1214.

In step 1214, a burst detection is signaled if all three of the conditions represented by decision blocks 1204, 1208, and 1212 is satisfied, namely (a) that a short-term power change of sufficient magnitude has been detected; (b) that a long-term power change of sufficient magnitude has been detected; and (c) that a predetermined pattern of symbols has been detected.

Upon detection of a burst, depending on the application, various steps such as frequency and/or timing acquisition, or demodulation, may be allowed to occur. The process may then iterate in order to detect additional bursts.

The foregoing method may be embodied in the form of computer readable media, memory, or circuitry, which tangibly embodies the foregoing method in the form of instructions or some other form.

In addition, it should be appreciated by one of ordinary skill in the art that, in lieu of determining if the power changes exceed predetermined thresholds, steps 1204 and 1208 may involve determining if the power changes equal or exceed predetermined thresholds, or some other method of determining if the power changes are of a sufficient magnitude to distinguish over noise.

It should further be appreciated that embodiments are possible in which separate short-term and long-term power changes are not monitored, where only a single power change is monitored, or where two or more power changes are monitored which differ by other than time horizon.

From the foregoing, it should be appreciated that a burst detection system has been described and illustrated which is capable of detecting bursts represented by packets with relatively short preambles, although the application of the system is not so limited.

Another advantage is accurate detection of bursts through the joint operation of the one or more power change detectors and the one or more pattern detectors, whereby the one or more power change detectors reduce the chance of a false negative condition, i.e., the failure to detect a burst at all, while the one or more pattern detectors reduce or eliminate the chance of a false positive condition, i.e., the false detection of a burst.

Further advantages will be apparent to those of ordinary skill in the art from a reading of this disclosure.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A burst detection system for detecting a burst in an incoming signal comprising:
    a signal strength change detector for determining strength changes in the incoming signal;
    signal strength detection logic for determining if a change in signal strength of a predetermined magnitude has occurred;
    a pattern detector for monitoring patterns of symbols in the incoming signal to determine if a predetermined pattern is present;
    a burst detector for signaling a detection of a burst if the signal strength change detection logic determines that a signal strength change of predetermined magnitude has occurred and the pattern detector determines that a predetermined pattern of symbols is present;
    a signal strength indicator for indicating the strength of the incoming signal;
    a short-term signal strength change detector for determining, responsive to the signal strength indicator, short-term changes in signal strength, and a long-term signal strength change indicator for determining, responsive to the signal strength indicator, long-term changes in signal strength;
    wherein the signal strength detection logic is configured to determine, responsive to the short-term and long-term signal strength change detectors, if a short-term change in signal strength of a predetermined magnitude has occurred, and a long-term change in signal strength of a predetermined magnitude has occurred;
    a signal strength indicator for indicating the strength of the incoming signal, and the short-term and long-term signal strength change detectors respectively determine short-term and long-term changes in signal strength responsive to the indication of signal strength provided by the signal strength indicator;
    wherein the short-term signal strength change detector is configured to determine $A_n$, a current moving average of M samples of $a_n$, the indication of signal strength provided by the signal strength indicator, and $B_n$, a previous moving average of M samples of $a_n$, where M is a non-negative integer.

2. The system of claim 1 wherein the signal strength change detection logic is configured to determine if a short-term change in signal strength of sufficient magnitude has occurred by determining if the ratio of $A_n$ to $B_n$ exceeds a predetermined threshold.

3. The system of claim 1 wherein the short-term signal strength change detector is configured to determine $C_n$, a long-term average of $a_n$, in accordance with the following expression: $C_n=(1-\sigma)*C_{n-1}+a_n$, where $\sigma$ is less than or equal to 1, and indicates the relative weights to be given to $C_{n-1}$ and $a_n$ in the computation of $C_n$.

4. The system of claim 3 wherein the signal strength change detection logic is configured to determine if a change in signal strength of predetermined magnitude has occurred by determining if the ratio of $A_n$ to $C_n$ exceeds a predetermined magnitude.

5. A burst detection system for detecting a burst in an incoming signal comprising:
    a signal strength change detector for determining strength changes in the incoming signal;
    signal strength detection logic for determining if a change in signal strength of a predetermined magnitude has occurred;
    a pattern detector for monitoring patterns of symbols in the incoming signal to determine if a predetermined pattern is present;
    a burst detector for signaling a detection of a burst if the signal strength change detection logic determines that a signal strength change of predetermined magnitude has occurred and the pattern detector determines that a predetermined pattern of symbols is present;
    a signal strength indicator for indicating the strength of the incoming signal;
    a short-term signal strength change detector for determining, responsive to the signal strength indicator, short-term changes in signal strength, and a long-term signal strength change indicator for determining, responsive to the signal strength indicator, long-term changes in signal strength;
    wherein the signal strength detection logic is configured to determine, responsive to the short-term and long-term signal strength change detectors, if a short-term change in signal strength of a predetermined magnitude has occurred, and a long-term change in signal strength of a predetermined magnitude has occurred;
    a symbol detector for detecting symbols, or estimates thereof, in the incoming signal, and the pattern detector monitors the symbols or estimates provided by the symbol detector to determine if a predetermined pattern of symbols is present;
    wherein the incoming signal is a quadrature baseband signal, and the symbol detector determines soft estimates $\delta\theta_n$ of the symbols; and
    a symbol spaced differentiator for determining, responsive to the samples $\delta\theta_n$ from the symbol detector, $\delta\delta\theta_n = \delta\theta_n - \delta\theta_{n-L}$ where L is the number of samples/symbol.

6. The system of claim 5 wherein the pattern detector determines if a predetermined pattern of symbols is present responsive to the values $\delta\delta\theta_n$ from the symbol spaced differentiator.

7. A method for detecting a burst in an incoming signal comprising:
    monitoring short-term signal strength changes in the incoming signal to determine if a short-term change in signal strength of predetermined magnitude has occurred;
    monitoring long-term signal strength changes in the incoming signal to determine if a long-term change in signal strength of predetermined magnitude has occurred;
    monitoring patterns of symbols in the incoming signal to determine if a predetermined pattern is present;

performing the foregoing three monitoring steps in parallel;

signaling detection of a burst if a short-term signal strength change of predetermined magnitude has occurred, a long-term signal strength change of predetermined magnitude has occurred, and a predetermined pattern of symbols is present;

indicating the strength of the incoming signal, and monitoring short-term and long-term changes in signal strength responsive to the indication of signal strength; and determining $A_n$, a current moving average of M samples of $a_n$, the indication of signal strength, and $B_n$, a previous moving average of M samples of $a_n$, where M is a non-negative integer.

8. The method of claim 7 further comprising determining if a short-term change in signal strength of sufficient magnitude has occurred by determining if the ratio of $A_n$ to $B_n$ exceeds a predetermined threshold.

9. The method of claim 7 further comprising determining $C_n$, a long-term average of $a_n$, in accordance with the following expression: $C_n=(1-\sigma)\cdot C_{n-1}+\sigma\cdot a_n$, where a is less than or equal to 1, and indicates the relative weights to be given to $C_{n-1}$ and $a_n$ in the computation of $C_n$.

10. The method of claim 9 further comprising determining if a change in signal strength of predetermined magnitude has occurred by determining if the ratio of $A_n$ to $C_n$ exceeds a predetermined magnitude.

11. A method for detecting a burst in an incoming signal comprising:

monitoring short-term signal strength changes in the incoming signal to determine if a short-term change in signal strength of predetermined magnitude has occurred;

monitoring long-term signal strength changes in the incoming signal to determine if a long-term change in signal strength of predetermined magnitude has occurred;

monitoring patterns of symbols in the incoming signal to determine if a predetermined pattern is present;

performing the foregoing three monitoring steps in parallel;

signaling detection of a burst if a short-term signal strength change of predetermined magnitude has occurred, a long-term signal strength change of predetermined magnitude has occurred, and a predetermined pattern of symbols is present;

detecting symbols, or estimates thereof, in the incoming signal, and monitoring the symbols or estimates to determine if a predetermined pattern of symbols is present;

wherein the incoming signal is a quadrature baseband signal, and the method further comprises determining soft estimates $\delta\theta_n$ of the symbols; and determining, responsive to the samples $\delta\theta_n$, $\delta\delta\theta_n = \delta\theta_n - \delta\theta_{n-L}$, where L is the number of samples/symbol.

12. The method of claim 11 further comprising determining if a predetermined pattern of symbols is present responsive to the values $\delta\delta_n$.

* * * * *